United States Patent [19]

Kondo et al.

[11] Patent Number: 4,740,012

[45] Date of Patent: Apr. 26, 1988

[54] VEHICLE SUSPENSION SYSTEM HAVING TOE DIRECTION CONTROL MEANS

[75] Inventors: Toshiro Kondo; Tadanobu Yamamoto; Takeshi Edahiro, all of Hiroshima, Japan

[73] Assignee: Mazda Motor Corporation, Hiroshima, Japan

[21] Appl. No.: 42,450

[22] Filed: Apr. 24, 1987

[30] Foreign Application Priority Data

| Apr. 25, 1986 | [JP] | Japan | 61-94743 |
| Apr. 25, 1986 | [JP] | Japan | 61-94744 |
| Apr. 25, 1986 | [JP] | Japan | 61-94745 |
| Apr. 25, 1986 | [JP] | Japan | 61-94746 |
| Apr. 25, 1986 | [JP] | Japan | 61-94747 |
| Apr. 25, 1986 | [JP] | Japan | 61-94748 |
| Apr. 25, 1986 | [JP] | Japan | 61-94749 |

[51] Int. Cl.⁴ .................................................. B60G 3/06
[52] U.S. Cl. .................................... 280/690; 280/691; 280/725
[58] Field of Search ............ 280/690, 663, 700, 725, 280/724; 267/292, 287

[56] References Cited

U.S. PATENT DOCUMENTS

| 4,139,246 | 2/1979 | Mikoshiba et al. | 267/281 |
| 4,245,853 | 1/1987 | Inoue et al. | 280/725 |
| 4,269,432 | 5/1981 | Inoue et al. | 280/690 |
| 4,511,160 | 4/1985 | Inoue | 280/690 |
| 4,513,990 | 4/1985 | Morita et al. | 280/725 |
| 4,621,830 | 11/1986 | Kanai | 280/675 |
| 4,650,211 | 3/1987 | Tanahashi | 280/725 |

Primary Examiner—Kenneth R. Rice
Attorney, Agent, or Firm—Fleit, Jacobson, Cohn & Price

[57] ABSTRACT

A vehicle rear suspension system including a wheel hub supporting a rear wheel for rotation, a front lateral link extending transversely and connected through a front inner rubber bush with the vehicle body and through a front outer rubber bush with the wheel hub, a rear lateral link extending transversely and connected through a rear inner rubber bush with the vehicle body and through a rear outer rubber bush with the wheel hub. The rubber bushes have resiliencies such that deflections are produced under a transversely inwardly directed side force applied to the wheel from a road on which the wheel is running to produce a change in a toe direction of the wheel in a manner that the toe direction is changed with respect to an increase in the side force with a first rate under a first range of the side force, with a second rate which is smaller in a sense of toe-in direction that the first rate under a second range of the side force which is larger than the first range and with a third rate which is larger in a sense of toe-in direction than the second rate under a third range of the side force which is larger than the second range.

23 Claims, 15 Drawing Sheets

VEHICLE SUSPENSION SYSTEM HAVING TOE DIRECTION CONTROL MEANS

BACKGROUND OF THE INVENTION

1. Field of the Invention

The present invention relates to a vehicle suspension system and more particularly to a suspension system in which the toe direction of the wheel can be changed in accordance with a running condition of the vehicle.

2. Description of the Prior Art

Recent developments in motor vehicles includes an improvement in the suspension system so that the toe direction of a wheel, particularly a rear wheel is controlled in accordance with a running condition of the vehicle to thereby provide the vehicle with a desirable running property. For example, the U.S. Pat. No. 4,621,830 issued on Nov. 11, 1986 to S. Kanai discloses a vehicle suspension system in which the toe direction of a rear wheel is changed under a sidewardly directed force acting from the road to the wheel in a manner that the rate of change in the toe direction is increased as the side force is increased beyond a certain value. For example, the toe direction of the wheel is changed with a first ratio with respect to a change in the side force under the certain value of the side force, but the ratio is increased when the side force is increased beyond the certain value. With this structure, it becomes possible for example, as shown by the line b in FIG. 14 of the patent, to produce a toe-in movement in the rear wheel under a fast cornering operation or a lane change operation of the vehicle wherein the rear wheel is subjected to an increased side force to ensure a stable road gripping while suppressing a toe-in movement under an operation wherein the side force is small to permit a turning of a relatively small radius.

As an alternative solution, proposals are made to provide the vehicle suspension system with a hydraulic actuator for controlling the toe direction of the wheel. A detector is provided for detecting the side force in terms of a sideward acceleration so that the hydraulic actuator is operated when the side force is increased beyond a predetermined value to produce a toe-in movement of the wheel.

The conventional arrangements described above are designed so that the rear wheels are shifted in the toe-in direction as the side force is increased to thereby obtain an improved steering stability. It is also expected that the stability in a straight road operation can also be improved by this toe control. This is based on the concept that the vehicle running stability can be improved by shifting the rear wheels in a toe-in direction to thereby provide an improved road gripping of the wheels.

It should however be noted that the toe control of the rear wheels under the side force is not satisfactory in obtaining an improved stability in a straight road operation. This is particularly true under a high speed vehicle operation.

SUMMARY OF THE INVENTION

It is therefore an object of the present invention to provide a vehicle suspension system in which the toe direction of a wheel is controlled under a side force acting on the wheel but the stability under a high speed straight vehicle operation can be ensured without sacrificing the small turning radius under a small side force and a steering stability under a large side force.

Another object of the present invention is to provide a vehicle suspension system in which the toe direction of a wheel can be changed in three different ways in accordance with the side force acting on the wheel.

A further object of the present invention is to provide a vehicle suspension system in which the wheel is shifted to conduct a toe-in movement in a greater extent under an operation on a straight path and an operation which will produce a large side force, than under an operation in a curved path under a slow speed.

The present invention is based on the recognition by the inventors that the side force which acts on the wheels is much smaller in an operation on a straight path than in an operation for a fast turning or a lane change wherein a large side force is produced. In fact, the side force under an operation in a straight path is smaller than that under a slow speed turning wherein the side force is relatively small.

According to the present invention, there is therefore provided a vehicle suspension system including a wheel mounted for rotation about a rotation axis and for a toe changing movement, link means supporting the wheel so that a toe direction of the wheel can be determined by the link means, said link means including toe control means for changing the toe direction of the wheel in accordance with a sidewardly directed force acting on the wheel from a road on which the wheel is running in a manner that a rate of change in the toe direction as seen in a toe-in direction with respect to a change in the sidewardly directed force is larger in a region wherein the force is small and in a region wherein the force is large than in a region where in the force is medium.

According to a further aspect of the present invention, there is provided a vehicle suspension system including a wheel mounted on a wheel support rotatably about a rotation axis, a first lateral link extending substantially transversely with respect to a vehicle body and having a transversely inner end portion connected with the vehicle body for a vertical swinging movement and a transversely outer end portion connected with the wheel support for a vertical swinging movement, a second lateral link extending in a substantially transverse direction with respect to the vehicle body and having a transverse inner end portion connected with the vehicle body for a vertical swinging movement and a transversely outer end portion connected with the wheel support for a vertical swinging movement, at least one of the first and second links being provided with resilient means which deflects under a side force applied to the wheel from a road on which the wheel is running to produce a change in a toe direction of the wheel in a manner that the toe direction is changed with respect to an increase in the side force with a first rate under a first range of the side force, with a second rate which is smaller in a sense of toe-in direction than the first rate under a second range of the side force which is larger than the first range and with a third rate which is larger in a sense of toe-in direction than the second rate under a third range of the side force which is larger than the second range.

In a preferable aspect of the present invention, the first link may be inclined rearwardly as seen in a transverse outward direction. This arrangement will be effective in producing a toe-in movement in the wheel even under a relatively small side force.

The above and other objects and features of the present invention will become apparent from the following descriptions of preferred embodiments taking reference to the accompanying drawings.

DESCRIPTION OF THE PREFERRED EMBODIMENTS

Figure 1:
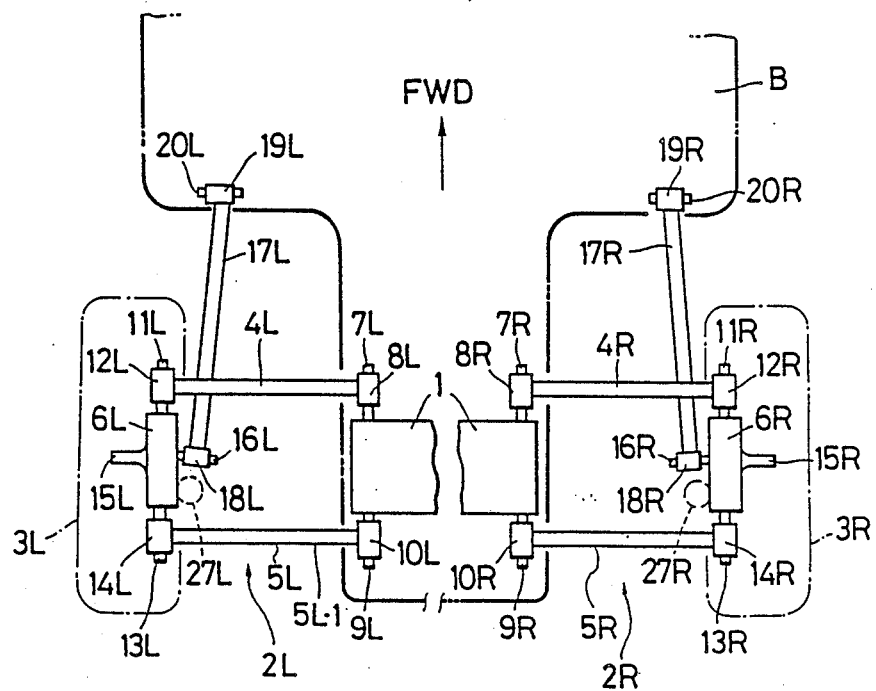
FIG. 1 is a fragmentary plan view of a vehicle rear suspension system embodying the features of the present invention.

Referring to the drawings, particularly to FIG. 1, there is shown a vehicle rear suspension system to which the present invention is applied. The left and right suspension mechanism are symmetrical with each other so that corresponding parts are designated by the same reference numerals with a suffix L for the left hand mechanism and a suffix R for the right hand mechansim. Further, descriptions will be made only for the right mechanism and the descriptions for the left mechanism will be omitted unless it is necessary.

Referring to FIG. 1, the vehicle has a body B provided with a rear sub-frame 1 which is connected through a suspension mechanism 2R with a rear wheel 3R. The suspension mechanism 2R comprises a front lateral link 4R and a rear lateral link 5R which extend in a lateral direction of the vehicle body B. The wheel 3R is supported for rotation about a rotation axis by a wheel support or a wheel hub 6R which has a spindle 15R for rotatably supporting the wheel 3R.

The front lateral link 4R is connected at the laterally inner end with a pin 7R on the sub-frame 1 through a rubber bush 8R. The laterally outer end of the front lateral link 4R is connected with a pin 11R on the wheel support 6R through a rubber bush 12R. Similarly, the rear lateral link 5R is connected at a laterally inner end with a pin 9R on the sub-frame 1 through a rubber bush 10R. The laterally outer end of the link 5R is connected with a pin 13R on the wheel hub 6R through a rubber bush 14R. In the embodiment shown in FIG. 1, the front and rear lateral links 4R and 5R are substantially parallel with each other and the spindle 15R for supporting the wheel 3R is located between the outer ends of the links 4R and 5R. It will be noted in FIG. 1 that the pins 7R, 9R, 11R and 13R and the rubber bushes 8R, 10R, 12R and 14R have their axes arranged substantially in the longitudinal direction of the vehicle body B. Therefore, the rear wheel 3R is vertically swingable with respect to the vehicle body B.

A tension rod 17R is provided to extend substantially in the longitudinal direction of the vehicle body B. The tension rod 17R has a rear end which is connected with a pin on the wheel hub 6R through a rubber bush 18R. The front end of the tension rod 17R is connected with a pin 20R on the vehicle body B through a rubber bush 19R. The pins 16R and 20R and the rubber bushes 18R and 19R have axes extending substantially in the transverse or lateral direction with respect to the vehicle body B so that they do not disturb the vertical swinging movement of the wheel 3R. As well known in the art, a strut assembly 27R is provided between the vehicle body and the wheel hub 6R.

Figure 4:
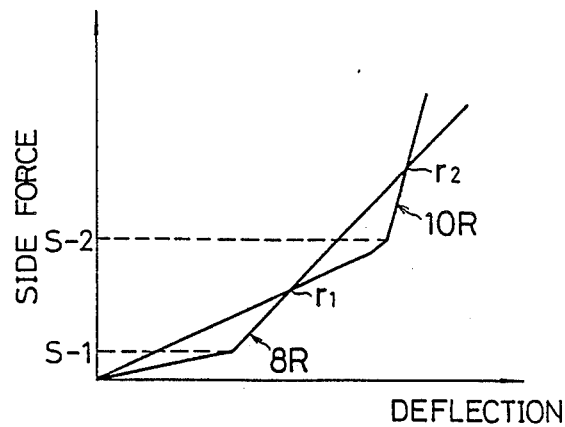
FIG. 4 is a diagram showing the relationship between the side force and the deflection of the frubber bushes in front and rear links.

In the embodiment being described, the rubber bush 8R has a deflecting property which is different from that of the rubber bush 10R. FIG. 4 shows the deflections of the rubber bushes 8R and 10R under a side force acting on the wheel 3R. The rubber bush 8R shows a deflection at a relatively greater rate until the side force increases to a value S-1 and then the rate of deflection decreases in the range of the side force beyond the value S-1. The rubber bush 10R shows a deflection rate which is smaller than the deflection rate of the rubber bush 8R under the side force below S-1 but larger than the deflection rate of the rubber bush 8R under the side force greater than the value S-1 until the side force increases to a second value S-2 which is larger than the value S-1. As the side force increases beyond the value S-2, the deflection rate increases to a value greater than that of the rubber bush 8R under the side force beyond the value S-1.

As shown in FIG. 4, the deflection curve for the rubber bush 8R intersects the deflection curve for the rubber bush 10R at two points r1 and r2. It will therefore be understood that with the side force lower than the value corresponding to the point r1, the front bush 8R shows a greater deflection than the rear bush 10R does. Between the values of the side force corresponding to the points r1 and r2, the deflection of the front bush 8R is smaller than that of the rear bush 10R. Further, with the side force greater than the value corresponding to the point r2, the deflection of the front bush 8R again becomes greater than that of the rear bush 10R. The outer bushes 12R and 14R have the same deflecting property.

Figure 2:
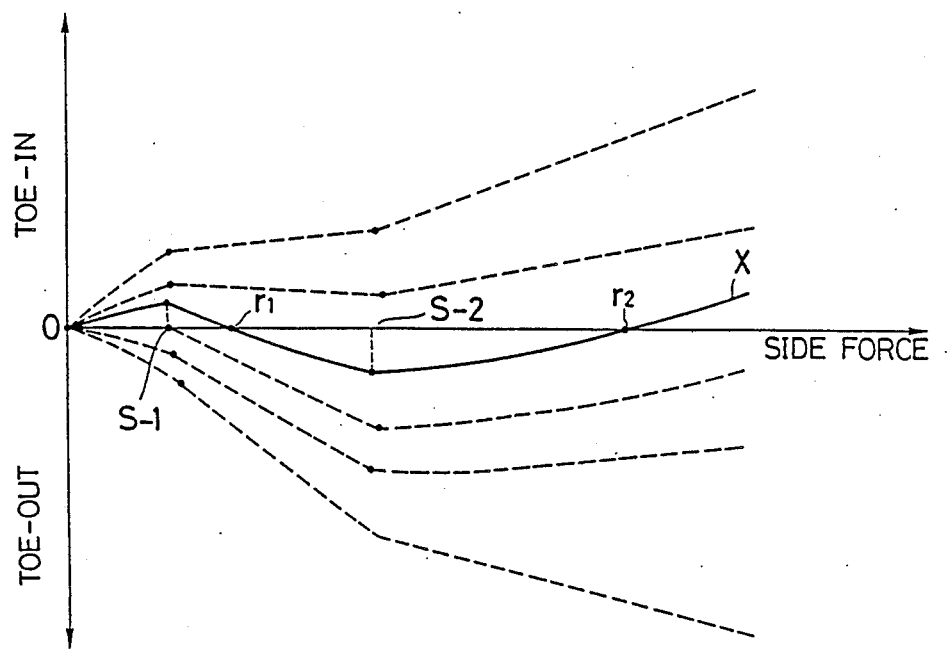
FIG. 2 is a diagram showing several types of wheel toe direction changes.

With the aforementioned arrangement, it is possible to have the rear wheel toe direction changed as shown in Figure 2. Under the side force smaller than the value corresponding to the point r1, the rear wheel 3R is moved in the toe-in direction as shown by the solid line with the peak value of the toe-in movement produced under the value S-1 of the side force. Under the side force between the values corresponding to the points r1 and r2, the rear wheel is moved in toe-in direction with the peak value appearing under the side force S-2. Under the side force greater than the value corresponding to the point r2, the wheel is moved again in the toe-in direction. By appropriately determining the compressive rigidity of the rubber bushes, it is possible to obtain several different toe direction control characteristics as shown by dotted lines in FIG. 2.

Figure 3:
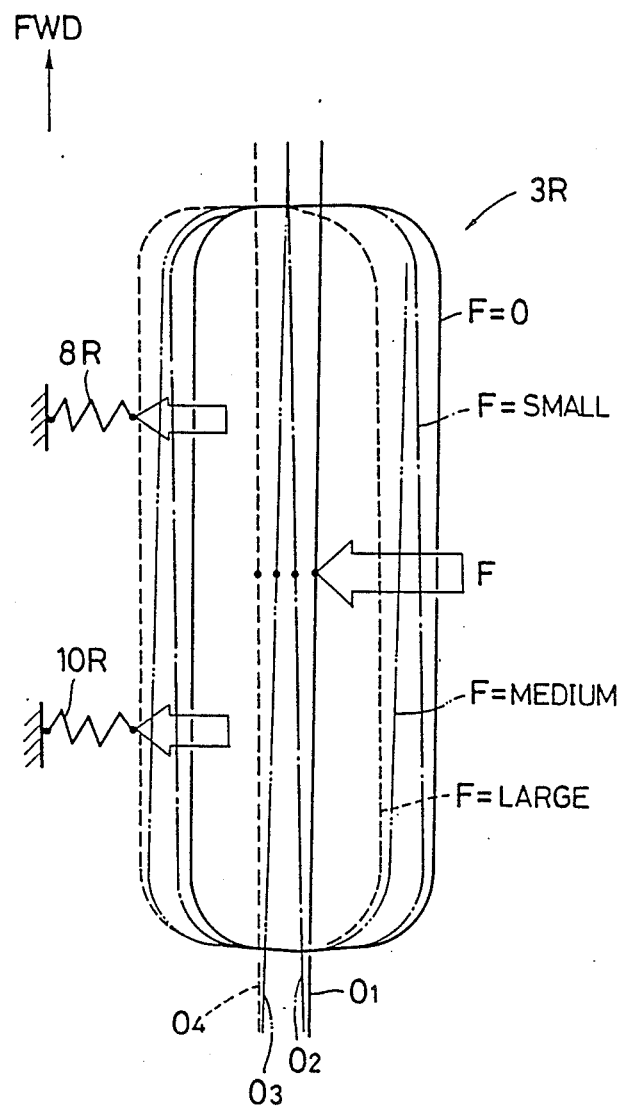
FIG. 3 is a plan view of the rear wheel in the suspension system in FIG. 1 showing the movements of the wheel under the side force.

Referring to FIG. 3, it will be noted that the side force F acts on the rear right wheel 3R form the road surface laterally inwardly as the vehicle passes a leftwardly curved path. In other words, the side forces is produced to act on the laterally outboard wheel in the laterally inward direction. The solid line F=0 shows the position of the wheel where the wheel is not subjected to a side force. At this instance, the center plane of the wheel is located to a position shown by a line $0_1$. When the wheel is subjected to a side force of a small value, the wheel is shifted to the position shown by a broken line F=small. Thus, a toe-in movement is produced in the wheel. The center plane of the wheel is located at a position shown by a line $0_2$. When the wheel is subjected to a side force of a medium value, the wheel is shifted to the position shown by a broken line F=medium to produce a toe-out movement. The center plane of the wheel is located at a position shown by a line $0_3$. When the side force is large, the wheel is shifted to the position shown by a dotted line F=large to produce a toe-in movement. The center plane of the wheel is located at a position shown by a line $0_4$ FIG. 3.

It will be noted in FIG. 3 that the rear wheel 3R is directed straight forward when the wheel is not subjected to a side force. When the wheel is subjected to a side force of a small value, the bush 8R in the front link 4R is deflected by a greater extent than in the bush 10R in the rear link 5R. This will cause a toe-in movement of the wheel as described above to thereby ensure a running stability on a straight road. Under a side force of a medium value, the bush 8R of the front link 4R deflects by a smaller extent than in the bush 10R of the rear link 5R. Therefore, a toe-out movement is produced in the wheel 3R so that a turning operation of a small radius is made possible. Under a side force of a large value, the deflection of the front bush 8R again becomes larger than that in the rear bush 10R. Thus, a toe-in movement is produced in the wheel ensuring a running stability under a high speed cornering or in a lane changing operation.

Figure 5:
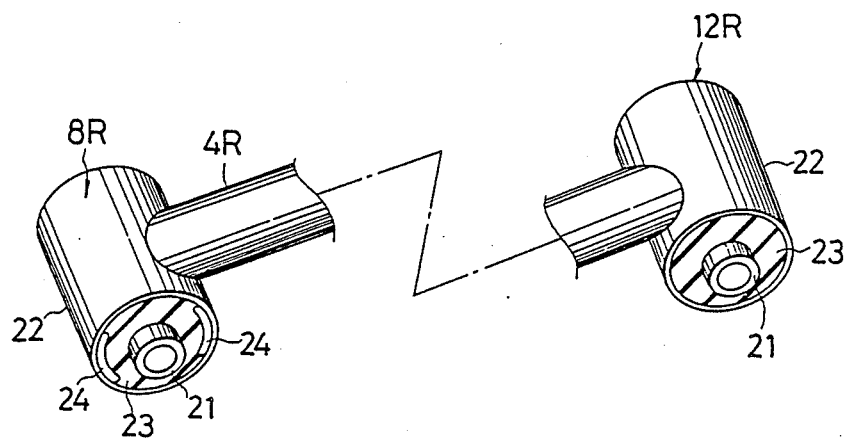
FIG. 5 is a perspective view of one of the front and rear links in the suspension system in FIG. 1.

Referring now to FIG. 5, it will be noted that the front inner bush 8R is constituted by an inner sleeve 21 and an outer tube 22 which are concentric with each other. Between the inner sleeve 21 and the outer tube 22, there is a cylindrical rubber member 23 which is connected at the inner surface with the sleeve 21 and at the outer surface with the outer tube 22. The lateral link 4R is connected at the inner end with the outer tube 22 of the bush 8R.

Figure 6:
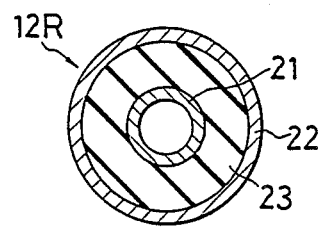
FIG. 6 is a cross-sectional view of the rubber bush used in the connection between the link and the wheel support.
Figure 7:
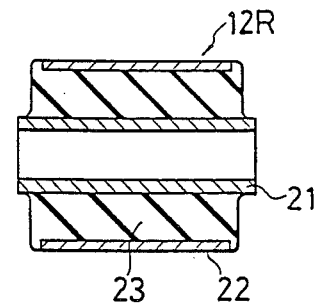
FIG. 7 is an axial sectional view of the rubber bush shown in FIG. 6.
Figure 8:
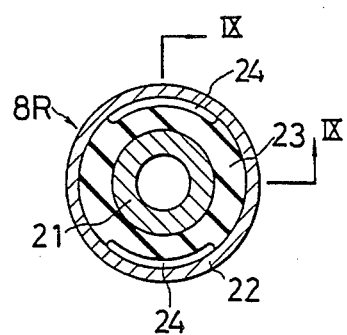
FIG. 8 is a cross-sectional view of the rubber bush used in the connection between the front link and the vehicle body.
Figure 9:
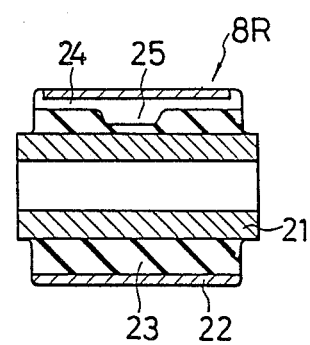
FIG. 9 is an axial sectional view of the rubber bush taken along a line IX—IX in FIG. 8.
Figure 10:
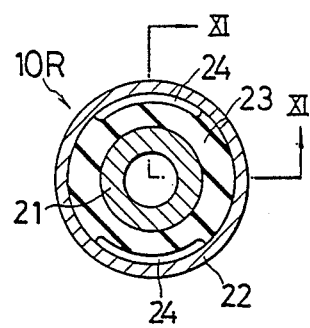
FIG. 10 is a cross-sectional view of the rubber bush used in the connection between the rear link and the vehicle body.
Figure 11:
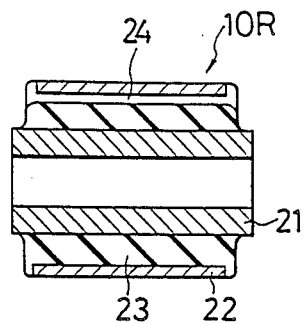
FIG. 11 is a sectional view taken along the line XI—XI in FIG. 10.

The outer bush 12R on the front link 4R has the same structure as in the bush 8R so that corresponding parts are designated by the same reference numerals. The only difference is that the rubber member 23 in the inner bush 8R is formed with cutouts 24 at diametrically opposite positions. FIGS. 6 and 7 show the structure of the bush 12R whereas FIGS. 8 and 9 show the structure of the bush 8R. Further, FIGS. 10 and 11 show the structure of the bush 10$. It should be noted that the bush 14R for the rear link 5R is the same in structure as the bush 12R. The bush 10R for the rear link 5R is similar to the bush 8R for the front link 4R, however, as shown in FIGS. 8 and 9, the bush 8R is formed at an axially intermediate portion of each cutout 24 with a recess 25 which is not formed in the member 23 of the bush 10R as shown in FIGS. 10 and 11. The rubber member 23 of the bush 10R is made of a material which is harder than that of the material of the rubber member 23 in the bush 8R so that the rate of deflection in the bush 10R is smaller than that in the bush 8R as long as the side force is smaller than the value S-1. As the side force increases beyond the value S-1, the rubber member 23 in the bush 8R is deflected to such an extent that the cutout 24 is filled by the rubber material in the member 23. Thus, the rate of deflection in the bush 8R is decreased to a value smaller than that of the bush 10R. Under the side force greater than the value S-2, the rubber material in the member 23 of the bush 10R is deflected to such an extent that the cutout 24 is filled by the material in the member 23. Thus, the rate of deflection of the bush 10R increases. Since the rubber member 23 in the bush 8R has a recess 25, the deflection rate is larger in the bush 8R than in the bush 10R.

Figure 12:
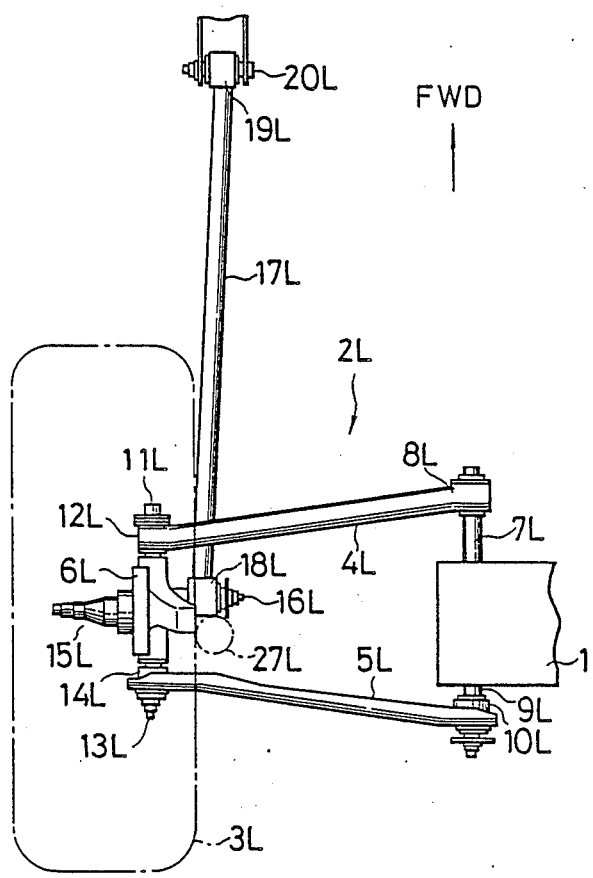
FIG. 12 is a plan view of a vehicle rear suspension mechanism showing another example to which the present invention can be applied.

FIG. 12 shows another type of vehicle rear suspension mechanism to which the present invention can be applied. In the mechanism shown in FIG. 12, the lateral links 4L and 5L are arranged that the laterally inner bushes 8L and 10L are longitudinally spaced apart by a distance greater than teh distance between the laterally outer bushes 12L and 14L.

Figure 13:
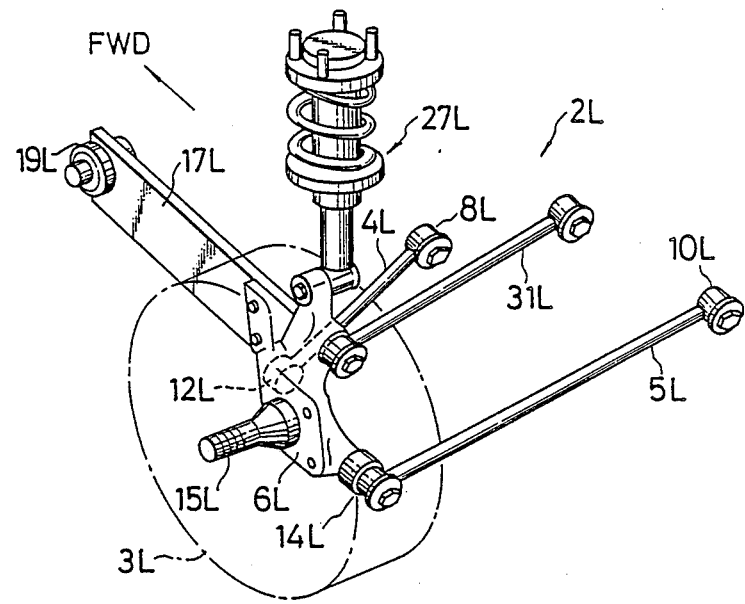
FIG. 13 is a perspective view showing a further example of the vehicle rear suspension mechanism to which the present invention can be applied.

In FIG. 13, there is shown a further example of the suspension mechanism to which the present invention can be applied. In this structure, an upper lateral link 31L is provided in addition to the lateral links 4L and 5L. Further, the tension rod 17L is in the form of a thin plate having a width extending in the vertical direction.

Figure 14:
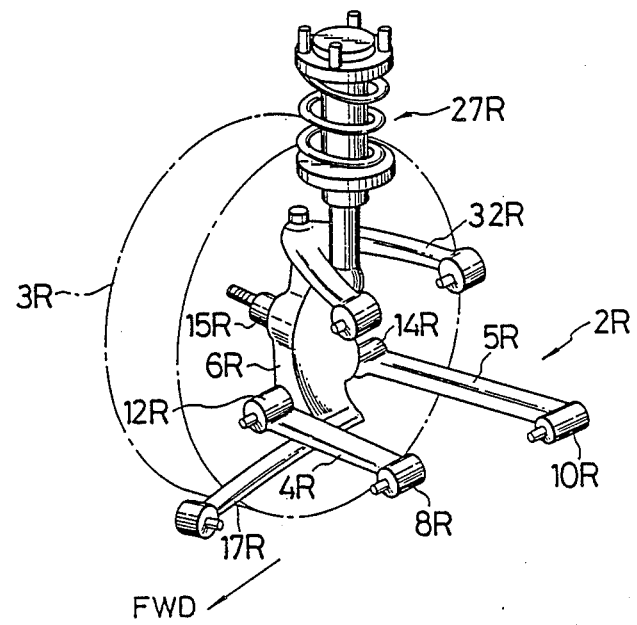
FIG. 14 is a perspective view of a further different type of the vehicle rear suspension mechanism to which the present invention can be applied.

Referring to FIG. 14, there is shown a further different type of suspension mechanism to which the present invention can be applied. In this structure, an upper link 32R of a bifurcated shape is provided in addition to the lateral links 4R and 5R. The present invention can be applied to these suspension mechanisms as in the suspension mechanism shown in FIG. 1.

Figure 15:
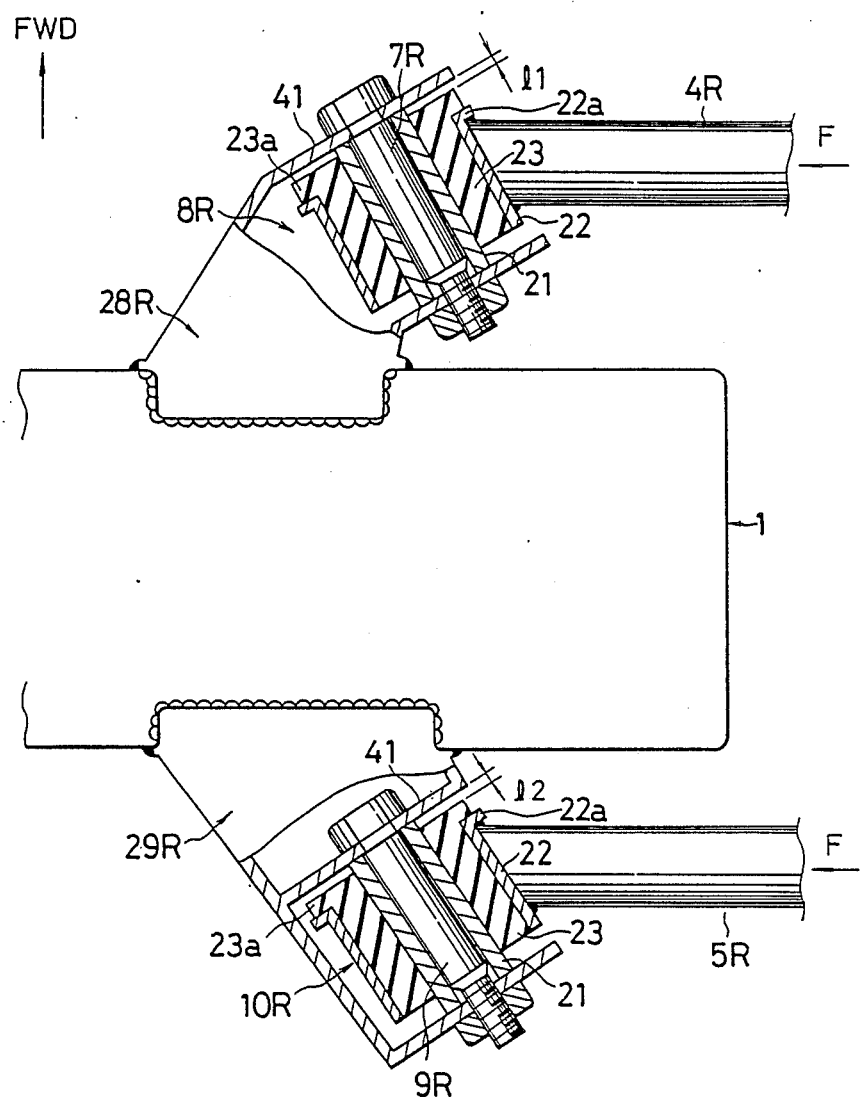
FIG. 15 is a horizontal sectional view showing a connection between the lateral links and the vehicle body in another embodiment of the present invention.

Referring to FIG. 15, there is shown another embodiment of the present invention in which the deflection property shown in FIG. 4 is obtained in a different manner. In the structure shown in FIG. 15, the laterally inner bush 8R of the front lateral link 4R is mounted on a bracket 28R provided on the sub-frame 1 by means of a pin or bolt 7R which has an axis inclined laterally inwardly toward forward with respect to the longitudinal axis of the vehicle body. At the front end, the outer tube 22 of the bush 8R is formed with a flange 22a and the rubber member 23 has an end flange 23a which is laid over the flange 22a on the outer tube 22. The front end surface of the flange 23a on the rubber member 23 is located with a gap $l_1$ with respect to a front flange 41 of the bracket 28R.

The laterally inner bush 10R on the rear lateral link 5R has a structure similar to the bush 8R and the pin or bolt 9R for installing the bush 10R on the bracket 29R is inclined as in the case of the bolt 7R for the bush 10R. The flange 23a of the rubber member 23 in the bush 10R is located with respect to the front flange 41 of the bracket 29R with a gap $l_2$. The gap $l_2$ is larger than the gap $l_1$. Further, the rubber member 23 in the front bush 8R is of a lower shear rigidity than the rubber member 23 in the rear bush 10R. In this embodiment, the rubber members 23 in the bushes 8R and 10R may have solid cylindrical portions without the cutouts as provided in the previous embodiments.

In this embodiment, when the side force F is applied as shown, the bushes 8R and 10R produce shearing deformations along the axes of the bolts 7R and 9R. Since the front bush 8R has a lower shearing rigidity than the rear bush 10R, the deformation in the front bush 8R is larger than that in the rear bush 10R. Under the side force beyond the value S-1, the flange 23a of the rubber member 23 in the front bush 8R abuts the flange 41 in the bracket 28R. In this instance, the rubber member 23 in the bush 8R produces a compressive deformation under the side force so that the rigidity is increased to a value greater than the shearing rigidity of the rear bush 10R. Under the side force F greater than the value S-2, the flange 23a of the rubber member 23 in the rear bush 10R abuts the flange 41 of the bracket 29R so that the bush produces a compressive deformation under the side force. Thus, the rigidity of the rear bush 10R is increased to a value greater than that of the front bush 8R.

Figure 16:
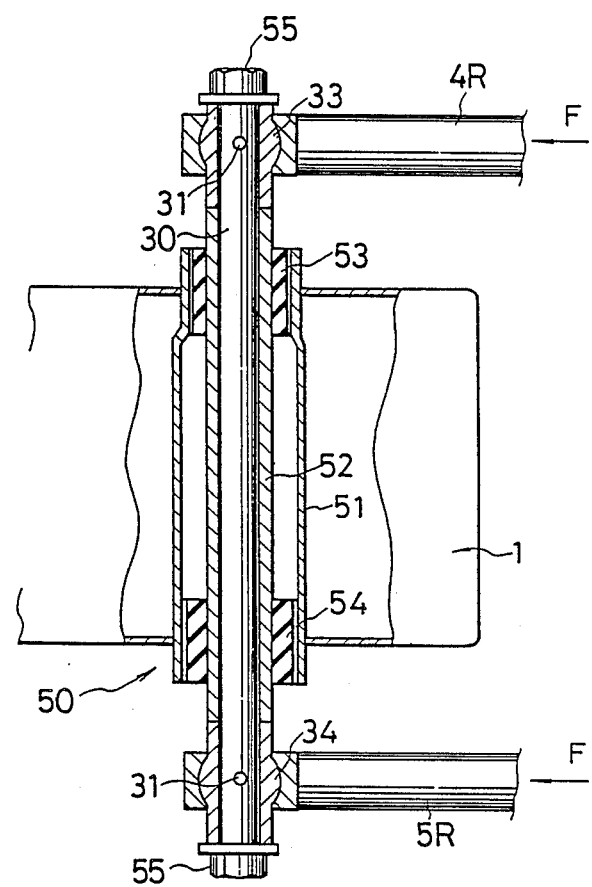
FIG. 16 is a horizontal sectional view similar to FIG. 15 but showing a further embodiment of the present invention.

Referring to FIG. 16, the embodiment shown therein includes a link support mechanism 50 which includes an outer tube 51 supported by the sub-frame 1 of the vehicle body. In the tube 51, there is an inner sleeve 52 which is coaxial with the outer tube 51. At the opposite ends of the outer sleeve 51, there are provided cylindrical rubber members 53 and 54, respectively, which are formed with cutouts as in the bushes 8R and 10R shown in FIGS. 8 through 11. More specifically, the rubber member 53 is similar in shape to the member 23 in the bush 8R whereas the rubber member 54 is similar in shape to the member 23 in the bush 10R.

The inner sleeve 52 extends beyond the ends of the outer tube 51. A connecting rod 30 extends through the inner sleeve 52 and has opposite ends projecting beyond the ends of the sleeve 52. The rod 30 is provided at the opposite end portions with spherical bearings 33 and 34 which are secured to the rod 30 by means of pins 31 and retained by nuts 55 threaded into the opposite ends of the rod 30. The front lateral link 4R is mounted at the laterally inner end on the bearing 33 and the rear lateral link 5R is mounted at the laterally inner end on the bearing 34. The operations of the suspension system shown in FIG. 16 are the same as in the embodiment shown in FIGS. 5 through 11.

Figure 17:
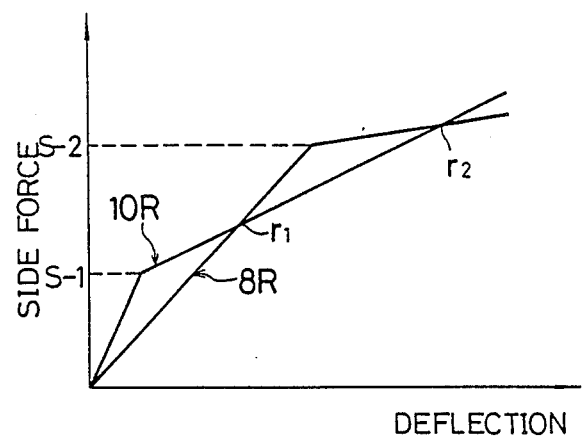
FIG. 17 is a diagram similar to FIG. 4 but showing deflections of the rubber bushes in a further embodiment of the present invention.

FIG. 17 is a diagram similar to FIG. 4 but showing another example of the deflection properties of the bushes. In this example, the front bush 8R shows a greater deflection than the rear bush 10R as in the example of FIG. 4 under the side force value S-1. At the side force value S-1, the deflection of the rear bush 10R is increased to a value larger than that of the front bush. With the side force greater than the value S-1, the front bush 8R shows a greater deflection than the rear bush 10R.

Figure 18:
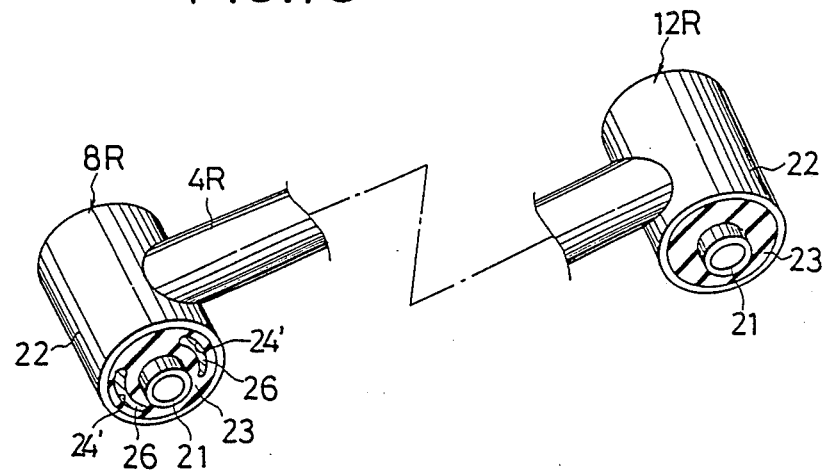
FIG. 18 is a perspective view similar to FIG. 5 but showing the link having the rubber bush which shows the deflection characteristics as shown in FIG. 17.

FIG. 18 shows an example for obtaining the property shown in FIG. 17. In this structure, the front inner bush 8R has a rubber member 23 which is formed at diametrically opposite positions with slots 24' of a certain radial dimensions. The slots 24' are filled with plastic plates 26 having radial dimensions larger than the radial dimensions of the slots 24' so that the rubber member 23 is applied with a precompression in the radial direction. The rear bush 10R has the same structure as the front bush 8R does. The rear bush 10R is applied with a precompression which is smaller than that of the front bush 8R. Further, the front outer bush 12R has a solid cylindrical rubber member 23 as well as the rear outer bush 14R does. It should however be noted that the rubber member 23 in the front bush 12R is of less compressive rigidity than in the rear bush 14R.

It will therefore be understood that with the side force smaller than the value S-1, the outer bushes produce compressive deflections and, due to the difference in the rigidity of the rubber members 23, the bush 12R shows a larger deflection than the bush 14R does. At the side force value S-1, the side force becomes equivalent to the precompression in the rubber member 23 of the rear bush 10R, so that the bush 10R starts to deflect under the side force together with the bush 14R. Thus, the lateral rigidity of the rear link 5R is decreased. With the side force greater than the value S-2, the side force is larger than the precompression force in the rubber member 23 of the front bush 8R. Thus, the front bush 8R is also deflected under the side force showing a lower ridigity.

Figure 19:
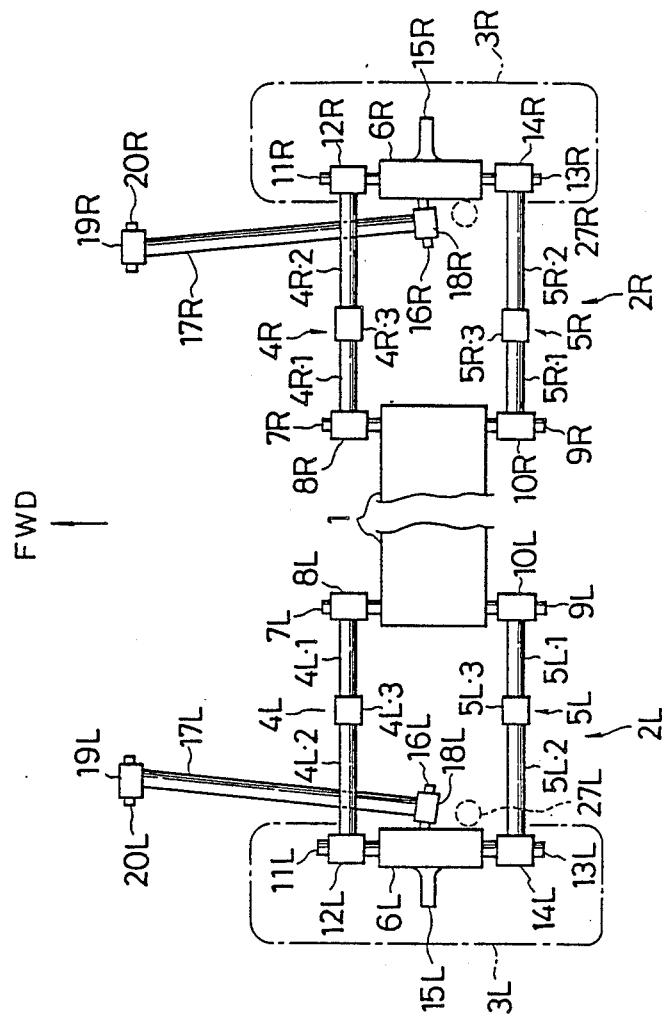
FIG. 19 is a plan view similar to FIG. 1 but showing a further different embodiment of the present invention.

Referring to FIG. 19, it will be noted that the embodiment shown therein is substantially identical with the embodiment shown in FIG. 1 so that corresponding parts are designated by the same reference numerals. In this embodiment, the right suspension mechanism includes a front lateral link assembly 4R which comprises an inner link rod 4R-1 and an outer link rod 4R-2 connected together by a connector 4R-3. The inner link rod 4R-1 has an inner end supported by the sub-frame 1 by means of a pin 7R and a front bush 8R as in the case of the front link 4R in the structure of FIG. 1. The outer link rod 4R-2 is connected with the wheel hub 6R by means of a pin 13R and a rear bush 14R. In this embodiment, the bushes 8R and 12R have cylindrical rubber members although not specifically shown.

Figure 20:
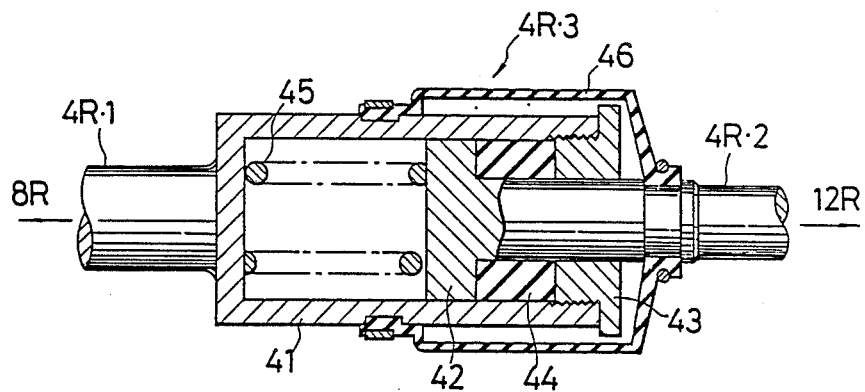
FIG. 20 is a sectional view showing the structure of the resilient mechanism in the link used in the suspension system of FIG. 19.

Referring to FIG. 20, it will be noted that the connector 4R-3 includes an outer cylindrical case 41 integral with the outer end of the inner link rod 4R-1 and a piston 42 integral with the inner end of the outer link rod 4R-2. The piston 42 is disposed in the case 41 for axial slidable movement. The case 41 has an open outer end which is closed by an end cap 43. Between the end cap 43 and the piston 42, there is a cylindrical rubber member 44. In the case 41, there is a coil spring 45 which forces the piston laterally outwardly of the vehicle body. A rubber boot 46 may be provided to cover the sliding portion of the outer link rod 4R-2.

The suspension mechanism further includes a rear link assembly 5R which is similar in structure to the front link assembly 4R and includes an inner link rod 5R-1 and 1n outer link rod 5R-2 which are connected together by means of a connector 5R-3. The inner link rod 5R-1 has an inner end connected with the sub-frame 1 through a pin 9R and a bush 10R. The outer link rod 5R-2 has an outer end connected with the wheel hub 6R through a pin 13R and a bush 14R. The connector 5R-3 is identical in structure with the connector 4R-3. The bushes 10R and 14R have solid cylindrical rubber members as in the bushes 8R and 12R.

In the embodiment being described, the rubber members of the outer bushes 12R and 14R have the same compressive rigidity to provide the same deflection property. The rubber member in the front inner bush 8R has a lower rigidity than that of the rubber member in the rear inner bush 10R. The spring 45 in the connector 4R-3 is stronger than the spring 45 in the connector 5R-3. Therefore, in operation, the front inner bush 8R produces a greater deflection under a side force in the range where the side force is smaller than the value S-1. With the side force value of S-1, the connector 5R-3 starts to deflect so that the deflection rate at the rear link assembly 5R becomes larger than that in the front link assembly 4R. With the side force value greater than S-2, the connector 4R-3 produces a deflection so that the deflection rate in the front link assembly 4R becomes larger than that of the rear link assembly 5R.

Figure 21:
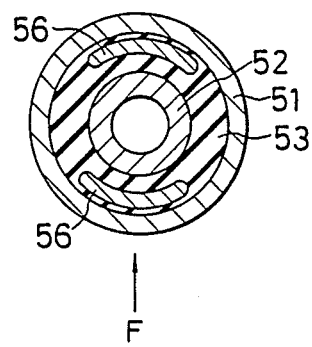
FIG. 21 is a cross-sectional view of the rubber bush used in a further embodiment of the present invention.

FIG. 21 shows a modification of the embodiment shown in FIG. 16. In this embodiment, the rubber member 53 is applied with a precompression by inserting plastic plates 56 as in the embodiment of FIG. 18. Similarly, the rubber member 54 in the rear end of the outer tube 51 is also applied with a precompression. By properly determining the precompressions in the front and rear rubber members 53 and 54, and the rigidity of the laterally outer bushes on the links 4R and 5R, it is possible to obtain the deflection property as shown in FIG. 17.

Figure 22:
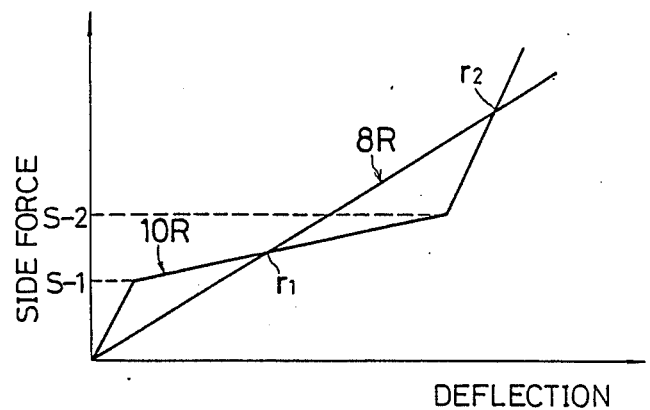
FIG. 22 is a diagram similar to FIGS. 1 and 17 but showing another example of the deflections in the rubber bushes.

Referring to FIG. 22, there is shown another example of the deflection property of the rubber bushes. In this example, the front bush 8R deflects proportionally with the side force. The rear bush 10R deflects with a lower rate than the front bush with the side force smaller than the value S-1. With the side force between the values between S-1 and S-2, the rear bush 10R shows a higher deflection rate than the front bush 8R. Under the side force greater than the value S-2, the rear bush 10R shows a deflection rate lower than that in the front bush 8R.

Figure 23:
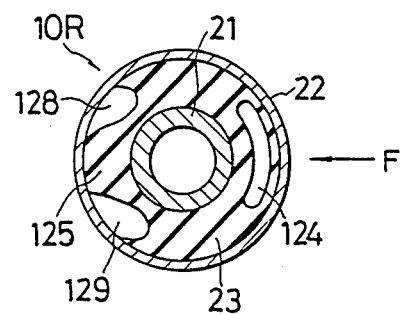
FIG. 23 is a cross-sectional view of a rubber bush which shows the deflection shown in FIG. 22.

In FIG. 23, there is shown one example of the laterally inner bush 10R on the rear lateral link 5R for obtaining the property shown in FIG. 22. In this embodiment, the rubber member 23 in the bush 10R is formed with a slot 124 of an arcuate cross-sectional configuration. At the side diametrically opposite to the slot 124, the rubber member 23 is further formed with cutouts 128 and 129. The other bushes 8R, 12R and 14R have solid cylindrical rubber members. In the area 125 between the cutouts 128 and 129, the rubber material is applied with a precompression. Due to the precompression, the rubber member 23 in the bush 10R is shows a larger rigidity than the rubber member in the front bush 8R does so that the bush shows a smaller deflection rate or a greater rigidity than the bush 8R does until the side force increases to a value corresponding to the precompression of the rubber material in the area 125. With the side force between the values S-1 and S-2, the precompression in the area 125 is relieved so that the rigidity of the rubber member 23 is decreased and the rubber member 23 deflects by having the slot 124 crashed so that the bush 10R shows a larger deflection rate than the bush 8R. With the side force greater than the value S-2, the slot 124 is filled with the rubber material so that the bush 10R shows a greater rigidity or a smaller deflection rate.

Figure 24:
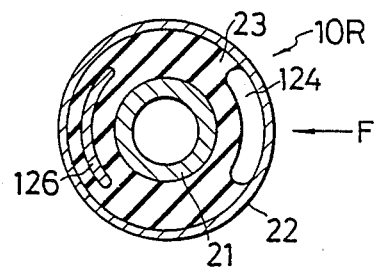
FIG. 24 is a cross-sectional view of a rubber bush showing another example which provides the deflection as shown in FIG. 22.

In the embodiment shown in FIG. 24, the rubber member 23 or the rear inner bush 10R is applied with a precompression by means of an insert plastic plate 126.

Figure 25:
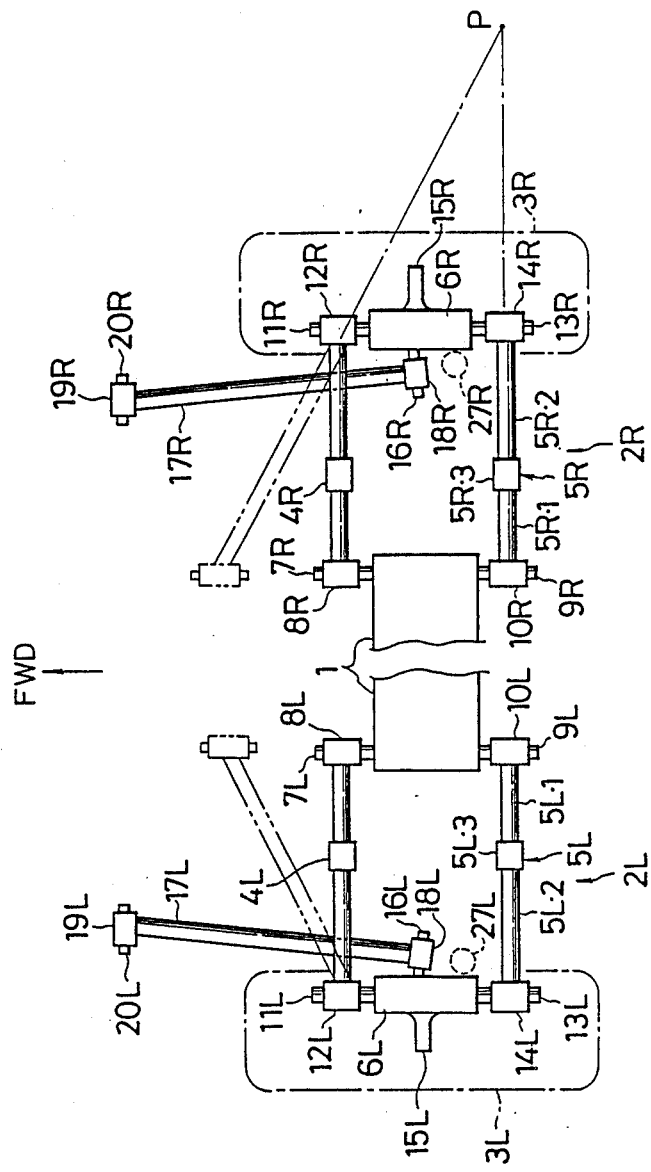
FIG. 25 is a plan view similar to FIGS. 1 and 19 but showing a further embodiment of the present invention.

Referring to FIG. 25, the embodiment shown therein is substantially similar to that shown in FIG. 1 so that corresponding parts are shown by the same reference numerals. In this embodiment, the suspension mechanism includes a rear lateral link assembly 5R which is comprised of an inner link rod 5R-1 and an outer link rod 5R-2 which are connected together by a connector 5R-3. The bushes 8R, 10R, 12R and 14R have solid cylindrical rubber members. The outer bushes 12R and 14R have the same compressive rigidity or the deflection properly. The inner front bush 8R is of less compressive rigidity than the inner rear bush 10R.

Figure 26:
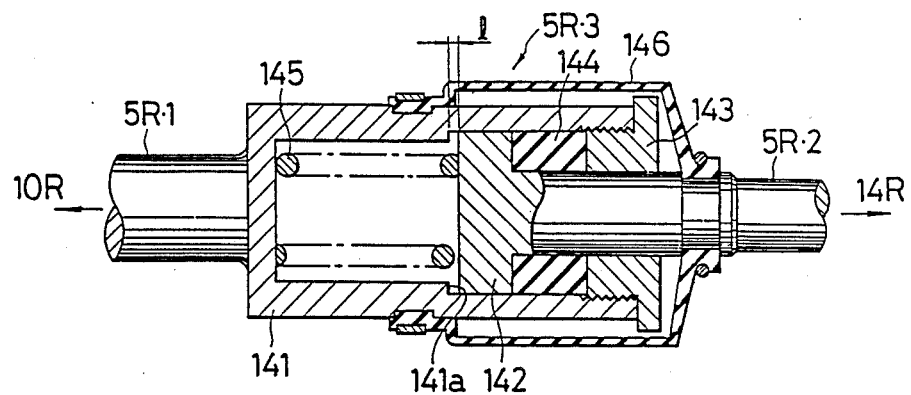
FIG. 26 is a sectional view showing the resilient mechanism used in the link of the suspension mechanism; and, FIG. 27 is a sectional view similar to FIG. 26 but showing another example.

Referring to FIG. 26, it will be noted that the connector 5R-3 includes a cylindrical case 141 integral with the inner link rod 5R-1 which is formed at an axial intermediate portion with a stepped shoulder 141a. In the axial inner portion with respect to the shoulder 141a, there is formed a small diameter portion whereas a large diameter portion is formed in the axial outer portion of the shoulder 141a. A piston 142 integral with the outer link 5R-2 is slidably engaged with the large diameter portion. A coil spring 145 is provided for biasing the piston 142 laterally outwardly of the vehicle body. The outer end of the case 141 is opened and an end cap 143 is attached to the open end. Between the end cap 143 and the piston 142, there is a cylindrical rubber member 144. A flexible boot 146 is provided to cover the sliding portion of the outer link rod 5R-2. As shown in FIG. 26, the piston 142 has a gap 1 with respect to the shoulder 141a when the side force is not applied to the lateral link assembly 5R.

In operation, when the side force is smaller than the value S-1, the side force is smaller than the precompression of the spring 145 so that the deflection is produced only in the bushes 8R, 10R, 12R and 14R. Since the bush 8R is of a less rigidity than the bush 10R, the deflection rate in the rear link assembly 5R is smaller than that in the front link 4R. With the side force between the values S-1 and S-2, the side force is greater than the precompression of the spring 145 so that the spring 145 is deflected. Thus, the rear link assembly 5R shows a greater deflection than the front link 4R does. At the side force value of S-2, the piston abuts the shoulder 141a so that deflections are produced only in the bushes 10R and 14R in relation to the rear link assembly 5R. It will therefore be understood that the deflection in the rear link assembly 5R is again increased to a value larger than that in the front link 4R as shown in FIG. 22.

Figure 27:
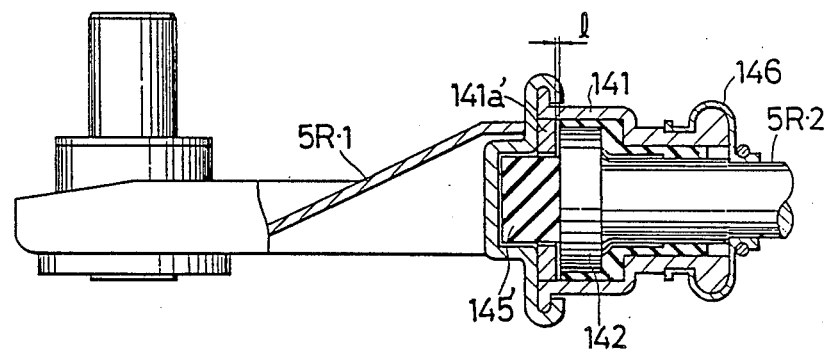

Referring to FIG. 27, there is shown a modification of the connector 5R-3. In this embodiment, the spring 145 in the previous embodiment is substituted by a rubber block 145' which is arranged in position with a precompression and the piston 142 is in abutting engagement with the rubber block 145'. A stopper plate 141' is provided with a gap 1 with respect to the end surface of the piston 142. The function of the connector shown in FIG. 27 is the same as that of the connector 5R-3.

In the embodiment shown in FIG. 25, the front link 4R may be inclined outwardly toward rearward as shown by phantom lines so that an extension of the front link 4R intersects an extension of the rear link assembly 5R at a point P. With this arrangement, the side force produces a toe-in movement in the wheel because of the geometrical relationship so that the aforementioned function can be further promoted.

It will be noted that the structure of the rubber member shown in FIGS. 23 or 24 can be used in the place of the rubber members 54 of the structure shown in FIG. 16. In this instance, the front rubber member 53 in FIG. 16 is substituted by a solid cylindrical member. By appropriately determining the rigidities of the rubber members, it is possible to obtain the deflection properties as shown in FIG. 22.

The invention has thus been shown and described with reference to specific embodiments, however, it should be noted that the invention is not limited to the details of the illustrated structures but changes and modifications may be made without departing from the scope of the appended claims.

We claim:

1. A vehicle suspension system inlcuding a wheel mounted on a wheel support rotatably about a rotation axis, a first lateral link extending substantially transversely with respect to a vehicle body and having a transversely inner end portion connected with the vehicle body for a vertical swinging movement and a transversely outer end portion connected with the wheel support for a vertical swinging movement, a second lateral link extending in a substantially transverse direction with respect to the vehicle body and having a transverse inner end portion connected with the vehicle body for a vertical swinging movement and a transversely outer end portion connected with the wheel support for a vertical swinging movement, at least one of the first and second links being provided with resilient means which deflects under a transversely inwardly directed side force applied to the wheel from a road on which the wheel is running to produce a change in a toe direction of the wheel in a manner that the toe direction is changed with respect to an increase in the side force with a first rate under a first range of the side force, with a second rate which is smaller in a sense of toe-in direction than the first rate under a second range of the side force which is larger than the first range and with a third rate which is larger in a sense of toe-in direction than the second rate under a third range of the side force which is larger than the second range.

2. A vehicle suspension system in accordance with claim 1 in which said resilient means includes first laterally inner resilient mechanism provided at the transverse inner end portion of the first lateral link, first laterally outer resilient mechanism provided at the transverse outer end portion of the first lateral link, second laterally inner resilient mechanism provided at the transverse inner end portion of the second lateral link, second laterally outer resilient mechanism provided at the transverse outer end portion of the second lateral link.

3. A vehicle suspension system in accordance with claim 2 in which said resilient mechanisms are resilient bushes.

4. A vehicle suspension system in accordance with claim 2 in which said first lateral link is positioned forwardly of the second lateral link, said first inner and outer resilient mechanisms having an overall rigidity which is lower than an overall rigidity of said second inner and outer resilient mechanisms, at least one of said first inner and outer resilient mechanisms being provided with first means for increasing said overall rigidity under the side force beyond a first predetermined value, at least one of said second inner and outer resilient mechanisms being provided with second means for increasing said overall rigidity under the side force beyond a second predetermined value which is larger than said first predetermined value.

5. A vehicle suspension system in accordance with claim 4 in which said resilient mechanisms are resilient buches having resilient members, said first means being slot means formed in the resilient member in at least one of said first inner and outer resilient mechanisms, said second means being slot means formed in the resilient member in at least one of said second inner and outer resilient mechanisms.

6. A vehicle suspension system in accordance with claim 2 in which said first lateral link is positioned forwardly of the second later link, said first inner and outer resilient mechanisms having an overall rigidity which is lower than an overall rigidity of said second inner and outer resilient mechanisms, at least one of said first inner and outer resilient mechanisms being provided with first means for decreasing said overall rigidity under the side force beyond a first predetermined value, at least one of said second inner and outer resilient mechanisms being provided with second means for decreasing said overall rigidity under the side force beyond a second predetermined value which is smaller than said first predetermined value.

7. A vehicle suspension system in accordance with claim 6 in which said resilient mechanisms are resilient bushes having resilient members, said first means being means provided in the resilient member in at least one of said first inner and outer resilient mechanisms for applying a precompression, said second means being means provided in the resilient member in at least one of said second inner and outer resilient mechanisms for applying a precompression.

8. A vehicle suspension system in accordance with claim 2 in which said first inner resilient mechanism is a resilient bush arranged with a longitudinal axis inclined laterally movement, link means supporting the wheel so that a toe direction of the wheel can be determined by the link means, said link means including toe control means for changing the toe direction of the wheel in accordance with a laterally inwardly directed force acting on the wheel from a road on which the wheel is running in a manner that a rate of change in the toe direction as seen in a toe-in direction with respect to a change in the laterally inwardly directed force is larger in a region wherein the force is small and in a region wherein the force is large than in a region wherein the force is medium.

9. A vehicle suspension system in accordance with claim 1 in which said first lateral link is positioned forwardly of the the second link, said resilient means including first resilient means provided in said first lateral link for providing said first lateral link with a first overall rigidity which is substantially constant, and second resilient means provided in said second lateral link for providing said second lateral link with a second overall rigidity which is larger than the first overall rigidity in a range of the side force smaller than a first predetermined value and in a range of the side force larger than a second predetermined value which is larger than said first predetermined value, and smaller than the first predetermined value in a range of the side force between the first and second predetermined values.

10. A vehicle suspension system in accordance with claim 9 in which said second lateral link includes a second laterally inner rod and a laterally outer rod, said second resilient means including a second laterally inner resilient mechanism provided on a transversely inner end portion of the second laterally inner rod, a second laterally outer resilient mechanism provided on a transversely outer end portion of the second laterally outer rod, and a second intermediate resilient mechanism provided between said second laterally inner and outer rods of said second lateral link.

11. A vehicle suspension system in accordance with claim 10 in which said second intermediate resilient mechanism includes precompression means for applying a precompressed load to a connection between the second laterally inner and outer rods and stopper means for limiting a stroke of said second intermediate resilient means to a predetermined value.

12. A vehicle suspension system in accordance with claim 9 in which said second lateral link includes a second laterally inner rod and a laterally outer rod, said second resilient means including a second laterally inner resilient mechanism provided on a transversely inner end portion of the second laterally inner rod, a second laterally outer resilient mechanism provided on a transversely outer end portion of the second laterally outer rod, at least one of the second laterally inner and outer resilient mechanism being provided with means for producing the change of rigidity in said second resilient means.

13. A vehicle suspension system in accordance with claim 12 in which said one resilient mechanism is a resilient bush having a substantially cylindrical resilient member, said last mentioned means being a slot formed at one side of the resilient member and precompression means for applying a precompression to said resilient member at the other side.

14. A vehicle suspension system in accordance with claim 9 in which said first lateral link is arranged to incline laterally inwardly toward forward so that an extension of the first lateral link intersect an extension of the second lateral link rearwardly of said rotation axis of the wheel.

15. A vehicle suspension system in accordance with claim 1 in which upper lateral link means is provided above said first and second lateral link to extend between the vehicle body and the wheel support.

16. A vehicle suspension system in accordance with claim 15 in which said upper lateral link means is in the form of a bifurcated configuration.

17. A vehicle suspension system in accordance with claim 1 in which said first and second lateral links are mounted at the transversely inner end portion on said vehicle body through a longitudinally extending rod, said resilient means being provided on said rod.

18. A vehicle suspension system including a wheel mounted on a wheel support rotatably about a rotation axis, first lateral link means extending substantially transversely with respect to a vehicle body and having a transversely inner end portion connected with the vehicle body for a vertical swinging movement and a transversely outer end portion connected with the wheel support for a vertical swinging movement, second lateral link means extending in a substantially transverse direction with respect to the vehicle body and having a transverse inner end portion connected with the vehicle body for a vertical swinging movement and a transversely outer end portion connected with the wheel support for a vertical swinging movement, at least one of the first and second link means being being comprised of a laterally inner rod and a laterally outer rod which are connected together by resilient means so that said one link means can produce an axial deflection under a transversely inwardly directed side force applied to the wheel from a road on which the wheel is running to produce a change in a toe direction of the wheel in a manner that the toe direction is changed with respect to an increase in the side force with a first rate under a first range of the side force, with a second rate which is smaller in a sense of toe-in direction than the first rate under a second range of the side force which is larger than the first range and with a third rate which is larger in a sense of toe-in direction than the second rate under a third range of the side force which is larger than the second range.

19. A vehicle suspension system in accordance with claim 18 which further includes a first laterally inner resilient mechanism provided at the transverse inner end portion of the first lateral link means, a first laterally outer resilient mechanism provided at the transverse outer end portion of the first lateral link means, a second laterally inner resilient mechanism provided at the transverse inner end portion of the second lateral link means, a second laterally outer resilient mechanism provided at the transverse outer end portion of the second lateral link means.

20. A vehicle suspension system in accordance with claim 19 in which said resilient means includes precompression means for applying a predetermined compressive force.

21. A vehicle suspension system in accordance with claim 18 in which said precompression means includes a precompression spring.

22. A vehicle suspension system including a wheel mounted for rotation about a rotation axis and for a toe changing movement, link means supporting the wheel so that a toe direction of the wheel can be determined by the link means, said link means including toe control means for changing the toe direction of the wheel in acordance with a laterally inwardly directed force acting on the wheel from a road on which the wheel is running in a manner that a rate of change in the toe direction as seen in a toe-in direction with respect to a change in the laterally inwardly directed force is larger in a region wherein the force is small and in a region wherein the force is large than in a region wherein the force is medium.

23. A vehicle suspension system including a wheel mounted on a wheel support rotatably about a rotation axis, a first lateral link extending substantially transversely with respect to a vehicle body and having a transversely inner end portion connected for a vertical swinging movement with a longitudinally extending rod provided on the vehicle body and a transversely outer end portion connected with the wheel support for a vertical swinging movement, a second lateral link extending in a substantially transverse direction with respect to the vehicle body and having a transverse inner end portion connected for a vertical swinging movement with the longitudinally extending rod on the vehicle body and a transversely outer end portion connected with the wheel support for a vertical swinging movement, said longitudinally extending rod being provided with resilient means which deflects under a transversely inwardly directed side force applied to the wheel from a road on which the wheel is running to produce a change in a toe direction of the wheel in a manner that the toe direction is changed with respect to an increase in the side force with a first rate under a first range of the side force, with a second rate which is smaller in a sense of toe-in direction than the first rate under a second range of the side force which is larger than the first range and with a third rate which is larger in a sense of toe-in direction than the second rate under a third range of the side force which is larger than the second range.

* * * * *